United States Patent

Bredt et al.

[11] Patent Number: 5,902,441
[45] Date of Patent: May 11, 1999

[54] METHOD OF THREE DIMENSIONAL PRINTING

[75] Inventors: James F. Bredt, Watertown; Timothy Anderson, Cambridge, both of Mass.

[73] Assignee: Z Corporation, Somerville, Mass.

[21] Appl. No.: 08/707,693

[22] Filed: Sep. 4, 1996

[51] Int. Cl.⁶ .................................................. B32B 31/00
[52] U.S. Cl. ........................ 156/284; 156/305; 264/123
[58] Field of Search ............................ 156/272.8, 275.1, 156/275.7, 283, 284, 305; 264/401, 482, 497, 123

[56] References Cited

U.S. PATENT DOCUMENTS

| | | |
|---|---|---|
| 4,247,508 | 1/1981 | Housholder . |
| 4,863,538 | 9/1989 | Deckard . |
| 4,938,816 | 7/1990 | Beaman et al. . |
| 4,944,817 | 7/1990 | Bourell et al. . |
| 5,017,753 | 5/1991 | Deckard . |
| 5,053,090 | 10/1991 | Beaman et al. . |
| 5,076,869 | 12/1991 | Bourell et al. . |
| 5,127,037 | 6/1992 | Bynum . |
| 5,132,143 | 7/1992 | Deckard . |
| 5,155,321 | 10/1992 | Grube et al. . |
| 5,155,324 | 10/1992 | Deckard . |
| 5,204,055 | 4/1993 | Sachs et al. . |
| 5,252,264 | 10/1993 | Forderhase et al. . |
| 5,296,062 | 3/1994 | Bourell et al. . |
| 5,316,580 | 5/1994 | Deckard . |
| 5,340,656 | 8/1994 | Sachs et al. . |
| 5,342,919 | 8/1994 | Dickens, Jr. et al. . |
| 5,352,405 | 10/1994 | Beaman et al. . |
| 5,382,308 | 1/1995 | Bourell et al. . |
| 5,387,380 | 2/1995 | Cima et al. . |
| 5,429,788 | 7/1995 | Ribble et al. . |
| 5,490,962 | 2/1996 | Cima et al. . |
| 5,518,680 | 5/1996 | Cima et al. . |
| 5,639,402 | 6/1997 | Barlow et al. ............................. 264/6 |

FOREIGN PATENT DOCUMENTS

WO 95/30503  11/1995  WIPO .

OTHER PUBLICATIONS

Khanuia, S.S.; "Origin and Control of Anisotropy in Three Dimensional Printing of Structural Ceramics", (Doctoral Thesis), Massachusettes Institute of Technology, Feb. 1996.
Borland, S.W.; "Characterization of Fundamental and Reticulated Biomedical Polymer Structures Fabricated Three Dimensional Printing", (Doctoral Thesis), Massachusettes Institute of Technology, Jun. 1995.

*Primary Examiner*—Michael W. Ball
*Assistant Examiner*—Shawn A. Mitchell
*Attorney, Agent, or Firm*—Wolf, Greenfield & Sacks

[57] ABSTRACT

The present invention is directed to a Three Dimensional Printing materials systems and method that satisfies the need for a quick, reliable, safe, and inexpensive method for producing both appearance models and small numbers of functional parts in an office environment. The method of the present invention includes building cross-sectional portions of a three-dimensional article, and assembling the individual cross-sectional areas in a layer-wise fashion to form a final article. The individual cross-sectional areas are built by using an ink-jet printhead to deliver an aqueous solvent to an adhesive particulate mixture, causing the particles of the mixture to adhere together, and to previous cross-sectional areas.

26 Claims, 2 Drawing Sheets

METHOD OF THREE DIMENSIONAL PRINTING

BACKGROUND

1. Field of the Invention

This invention relates generally to rapid prototyping techniques, and more particularly to a Three Dimensional Printing material and method using adhesive particulate mixtures.

2. Related Art

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder Three Dimensional Printing process. The techniques are similar to the extent that they both use layering techniques to build three-dimensional articles. Both methods form successive thin cross sections of the desired article. The individual cross sections are formed by bonding together grains of a granular material on a flat surface of a bed of the granular material. Each layer is bonded to a previously formed layer to form the desired three-dimensional article at the same time as the grains of each layer are bonded together. The laser-sintering and liquid binder techniques are advantageous because they create parts directly from computer-generated design data and can produce parts having complex geometries. Moreover, Three Dimensional Printing can be quicker and less expensive than conventional machining of prototype parts or production of cast or molded parts by conventional "hard" or "soft" tooling techniques which can take from a few weeks to several months, depending on the complexity of the item.

Three Dimensional Printing has been used to make ceramic molds for investment casting, thereby generating fully-functional metal parts. Additional uses have been contemplated for Three Dimensional Printing.

For example, three Dimensional Printing may be useful in design-related fields where it is used for visualization, demonstration and mechanical prototyping. It may also be useful for making patterns for molding processes. Three Dimensional Printing techniques may be further useful, for example, in the fields of medicine and dentistry, where expected outcomes may be modeled prior to performing procedures. Other businesses that could benefit from rapid prototyping technology include architectural firms, as well as others in which visualization of a design is useful.

A selective laser sintering process is described in U.S. Pat. No. 4,863,568, which is incorporated herein by reference. The selective laser sintering process was commercialized by DTM Corporation. The selective laser sintering process involves spreading a thin layer of powder onto a flat surface. The powder is spread using a tool developed for use with the selective laser sintering process, known in the art as a counter-rolling mechanism (hereinafter "counter-roller"). Using the counter-roller allows thin layers of material to be spread evenly, without disturbing previous layers. After the layer of powder is spread onto the surface, a laser is used to direct laser energy onto the powder in a predetermined two-dimensional pattern. The laser printers or fuses the powder together in the areas struck by its energy. The powder can be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

The selective laser sintering process is expensive due to the high cost of the laser and the complexity of the equipment used. In addition, only one laser can be used at a time, making it a slow and labor intensive method. In addition, depending on the application, toxic materials are sometimes used in the selective laser sintering method, requiring special handling or processing facilities. For example, a typical selective laser sintering machine includes a nitrogen supply and a means for venting toxic gases away from human operators.

U.S. Pat. No. 5,204,055, incorporated herein by reference, describes an early Three Dimensional Printing technique which involves the use of an ink-jet printing head to deliver a liquid or colloidal binder material to layers of powdered material. The Three Dimensional ink-jet printing technique (hereafter "liquid binder method") involves applying a layer of a powdered material to a surface using a counter-roller. After the powdered material is applied to the surface, the ink-jet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier which evaporates, leaving the hardened binder behind. The powdered material can be ceramic, metal, plastic or a composite material, and can also include fiber. The liquid binder material can be organic or inorganic. Typical organic binder materials used are polymeric resins, or ceramic precursors such as polycarbosilazane. Inorganic binders are used where the binder is incorporated into the final articles; silica is typically used in such an application.

One advantage of using an ink-jet print head rather than a laser is that a plurality of spray nozzles used to deliver binder to the powder can be arranged side-by-side in a single print head. In selective laser sintering machines, only one laser, which delivers energy to the powder, is conventionally used. The combination of several spray nozzles increases the speed of liquid binder printing compared to laser-sintering by allowing a wider area to be printed at one time. In addition, the liquid binder printing equipment is much less expensive than the laser equipment due to the high cost of the laser and the high cost of the related beam deflection optics and controls.

However, the liquid binder printing technique has a serious reliability problem associated with the spray nozzle becoming clogged with the binder material. Clogging occurs when binders having high levels of suspended solids are used. The problem with clogging requires frequent interruptions of the build in order to clean the spray nozzle. The clogging problem increases the time and labor required to build parts and to maintain the equipment. Therefore, although the liquid binder printing technique represents an advance in speed and cost over the selective laser sintering process, it suffers from reliability problems that slow down the build rate, increasing labor and equipment maintenance costs. This problem interferes with the potential speed advantage of increased printing capability presented by the plurality of spray nozzles.

In addition to the above-mentioned disadvantages, the powders, especially metallic powders, used in both selective laser sintering and liquid binder techniques present safety issues that render them undesirable for use in an office environment. These safety issues may require special clothing and processing facilities to prevent, for example, skin contact or inhalation of toxic materials. In addition, more expense may be incurred through complying with regulations for the disposal of toxic materials. For these reasons, these techniques do not lend themselves to being used in typical office environments, such as architectural and design firms, or doctor's offices.

What is desired is a reliable, and inexpensive Three Dimensional Printing method for producing appearance models and small quantities of functional parts safely and easily in an office environment.

One object of the present invention is to provide a highly reliable method of fabricating appearance models and small amounts of functional parts.

Another object of the present invention is to provide a materials system that is non-toxic and sufficiently safe to use in an office environment.

Another object of the present invention is to provide a very fast method of fabricating appearance models and small amounts of functional parts.

Another object of the present invention is to provide a very inexpensive method of fabricating appearance models and small numbers of functional parts.

SUMMARY OF THE INVENTION

The present invention is directed to a materials system and method that satisfies the need for a quick, reliable, safe, and inexpensive method for producing both appearance models and small numbers of functional parts in an office environment.

An article having features of the present invention is made up of layers of a mixture of particles of an adhesive and filler, the adhesive having been activated by a fluid containing a solvent and optionally, various processing aids or additions which modify the working properties of the fluid and adhesive or which enhance the mechanical properties of the finished article. The mixture of particles can also optionally include particles of fiber, and various processing aids. A fluid activates the adhesive in the mixture, causing the particles to adhere together, and to adhere to previously formed adjacent layers. The adhesive is preferably directly mixed in with the fiber and filler. Optionally, the adhesive can also coat particles of either the fiber or filler, or both.

The method of the invention for producing such articles includes applying a layer of the above-mentioned mixture onto a flat surface that can be indexed downward. Cross-sectional portions of an article are defined by delivering an activating fluid to the layer of the mixture of particles in a predetermined two-dimensional pattern. The fluid activates the adhesive in the mixture, causing the particles to adhere together in an essentially solid layer. After the first cross-sectional portion of the article is formed, the movable surface can be indexed downward by an amount corresponding to the desired layer thickness. Successive layers of the mixture of particles are applied to previous layers in the same manner. Application of the fluid using, for example, an ink-jet print head follows the application of each successive layer of the mixture of particulate material. The steps of depositing a layer of the mixture of particulate material and delivering the fluid to the layer are repeated until the required number of cross-sectional portions have been built, completing formation of the article. After formation of the article has been completed, it typically remains immersed in a bed of unactivated particulate material, where it can remain until the article is completely dry. Delicate features of the article remain supported by the unactivated particulate material while drying. The finished article is preferably scooped out of the bed of unactivated particulate material and any excess unactivated particulate material clinging to the finished article is preferably removed using blown air or a vacuum. In addition, the finished article can be removed to an oven for more rapid drying.

After cleaning, optional post-processing steps include heat-treating, resin or wax infiltration, painting and sanding. Cleaning is performed to remove excess powder by vacuuming it off the article, by blowing it off the article, and by brushing to remove any powder left in crevices. Heat treating and infiltration increase the strength and durability of the finished article. Infiltration can reduce porosity, making the article water resistant and more readily sanded. Painting the article can provide a more aesthetically pleasing appearance, and may also contribute to the strength and water resistance of the final articles. Sanding improves the surface smoothness, reducing any surface irregularities caused, for example, by fiber penetrating through the surface. Parts can be glued or fastened, or used as patterns for subsequent molding operations.

The materials system and method of the present invention offer the advantages of being able to fabricate relatively complex shapes reliably, quickly, safely and inexpensively compared to the selective laser sintering and liquid binder methods. Because the materials used in the present invention do not present problems with clogging, reliability is higher than prior art methods, particularly prior art methods in which high levels of suspended solids are contained in the binder. The higher reliability of the present invention results in reduced build times compared with prior art methods. The present invention is more economical than prior art methods because both the equipment and the materials used are inexpensive, and the high reliability associated with the materials and method of the present invention reduces cost even further. In addition, because the materials used in the present invention are non-toxic, the method of the present invention can be carried out safely in a typical office environment.

These and other features, aspects and advantages of the present invention will become better understood with reference to the following description and appended claims.

DETAILED DESCRIPTION

The present invention relates to a Three Dimensional Printing material system comprising a mixture of particles of adhesive, filler, and optionally a fibrous component and a printing aid for reducing edge curl due to uneven curing of the adhesive and resultant distortion of a part three dimensionally printed; and an activating fluid comprising a solvent that activates the adhesive in the powder and that can contain such processing aids as a humectant, a flowrate enhancer, and preferably a dye. The fluid of the present invention activates the adhesive in the particulate mixture, adhesively bonding the material together to form an essentially solid article. The present invention also relates to a method of use for such a materials system, and to an article made by the method of the invention.

Figure 1:
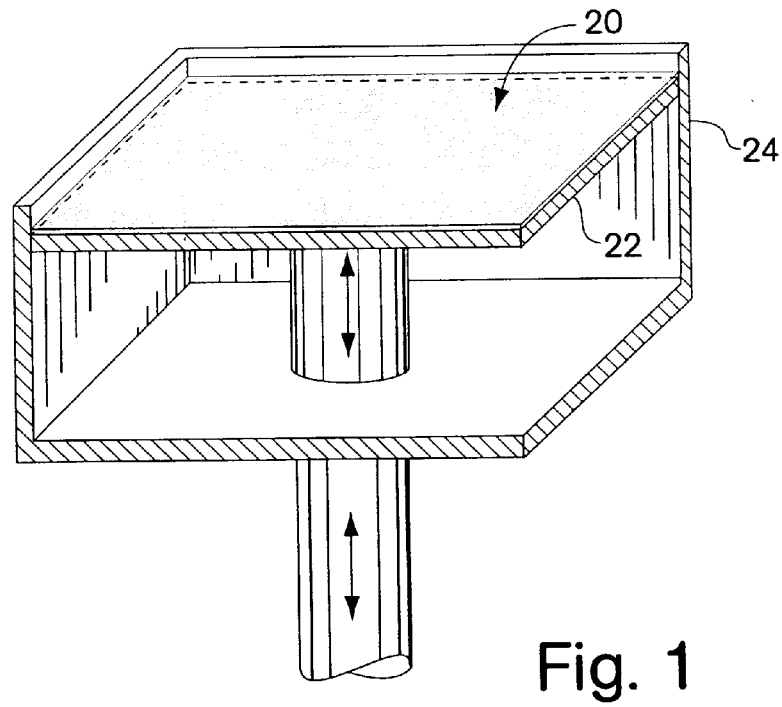
FIG. 1 illustrates schematically a first layer of a mixture of particulate material of the invention deposited onto a downwardly movable surface on which an article is to be built, before any fluid has been delivered.

Referring now to FIG. 1, a schematic representation of a printing method using the materials system of the present invention is presented. According to the method, a layer or film of particulate material 20 is applied on a downwardly movable surface 22 of a container 24. The layer or film of particulate material can be formed in any manner, and preferably is applied using a counter-roller. The particulate material applied to the surface includes an adhesive and filler. As used herein, "adhesive" is meant to define a component that forms the primary adhesive bonds in the mixture of material between portions of the mixture that were separate prior to activation by an activating fluid, and "filler" is meant to define a component that is solid prior to application of the activating fluid, which is substantially less soluble in the fluid than the adhesive, and which gives structure to the final article.

According to a preferred embodiment of the invention, the particulate mixture includes a reinforcing fiber, or a reinforcing fibrous component, added to provide structural reinforcement to the final article. The particulate material may include a plurality of particles of mean diameter of about 10–300 microns. As used herein, "fiber" or "fibrous component" is meant to define a component that is solid prior to application of the activating fluid, which is preferably, but not necessarily insoluble in the fluid, that is added to increase the final article strength. The reinforcing fiber length is restricted to a length approximately equal to the thickness of the layer of particulate mixture. The reinforcing fiber length is typically about 60 to about 200 microns in length, and is included in an amount not greater than 20 percent, by weight, of the total mixture.

According to a particularly preferred embodiment of the invention, a stabilizing fiber can be added to the filler to provide dimensional stability to the final article, as well as to slightly increase the article strength. Spreading the particulate mixture with the counter-roller becomes increasingly difficult as friction caused by an excess of stabilizing fiber in the mixture increases, reducing the packing density. Therefore, restricting both the amount and length of the stabilizing fiber increases the packing density of the mixture resulting in finished parts of greater strength. Preferably, the stabilizing fiber is restricted to a length of less than half of the reinforcing fiber, in an amount not greater than 30 percent, by weight, of the total mixture. Optimal values can be determined with routine experimentation using, for example, a counter-roller.

According to another particularly preferred embodiment, a compound such as lecithin which serves as a printing aid can be added to the particulate mixture to prevent distortions in printing. The printing aid prevents fine particles of the mixture from becoming airborne while the liquid is dispensed from the print head which would distort the printed article.

TABLE 1

| Ingredient | Preferred Compound | Acceptable Composition Range (W/W) | Preferred Composition (W/W) | Particle Size Range (μm) |
|---|---|---|---|---|
| Particulate Mixture | | | | |
| Adhesive | Sucrose | 10–50% | 30% | 10 |
| Reinforcing Fiber | Cellulose | 0–20% | 10% | 100 |
| Filler | Maltodextrin (Dextrose equivalent = 10) | 0–80% | 48.5% | <300 |
| Stabilizing Fiber | Cellulose | 0–30% | 10% | 60 |
| Printing Aid | Lecithin | 0–3% | 1.5% | N/A |
| Fluid | | | | |
| Solvent | Water | 70–100% | 92.98% | N/A |
| Humectant | Glycerol | 0–20% | 5% | N/A |
| Flowrate Enhancer | Ethylene Glycol Diacetate | 0–10% | 2% | N/A |
| Dye | Naphthol blue-black | 0–0.1% | 0.02% | N/A |

Figure 2:
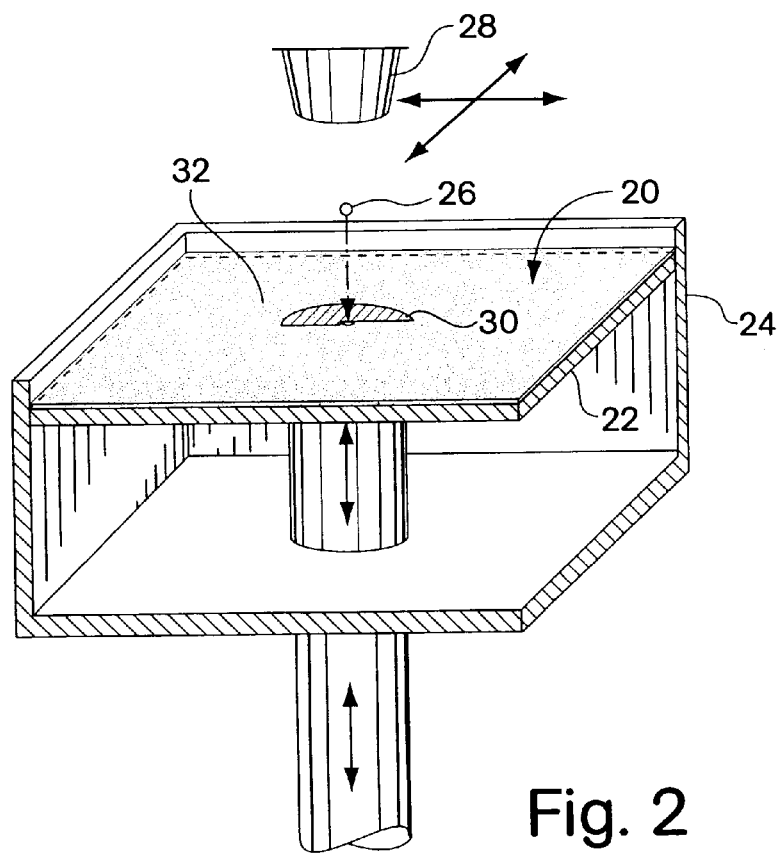
FIG. 2 illustrates schematically an ink-jet nozzle delivering an activating fluid to a portion of the layer of particulate material of FIG. 1 in a predetermined pattern.

FIG. 2 is a schematic representation of an ink-jet nozzle 28 delivering activating fluid 26 to a portion 30 of the layer or film 20 of the particulate mixture in a two-dimensional pattern. According to the method, the fluid 26 is delivered to the layer or film of particulate material in any predetermined two-dimensional pattern (circular, in the figures, for purposes of illustration only), using any convenient mechanism, such as a Drop-On-Demand (hereinafter "DOD") printhead driven by customized software which receives data from a computer-assisted-design (hereinafter "CAD") system, a process which is known in the art. The first portion 30 of the particulate mixture is activated by the fluid, causing the activated particles to adhere together to form an essentially solid circular layer that becomes a cross-sectional portion of the final article. As used herein, "activates" is meant to define a change in state from essentially inert to adhesive. When the fluid initially comes into contact with the particulate mixture, it immediately flows outward (on the microscopic scale) from the point of impact by capillary action, dissolving the adhesive within the first few seconds. A typical droplet of activating fluid has a volume of about 100 pl, and spreads to about 100 μm once it comes into contact with the particulate mixture. As the solvent dissolves the adhesive, the fluid viscosity increases dramatically, arresting further migration of the fluid from the initial point of impact. Within a few minutes, the fluid with adhesive dissolved therein infiltrates the less soluble and slightly porous particles, forming adhesive bonds between the filler and the fiber. The activating fluid is capable of bonding together the particulate mixture in an amount that is several times the mass of a droplet of the fluid. As volatile components of the fluid evaporate, the adhesive bonds harden, joining the filler and, optionally, fiber particulates into a rigid structure, which becomes a cross-sectional portion of the finished article.

Any unactivated particulate mixture 32 that was not exposed to the fluid remains loose and free-flowing on the movable surface. Preferably, the unactivated particulate mixture is left in place until formation of the final article is complete. Leaving the unactivated, loose particulate mixture in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second film or layer of the particulate mixture is then applied over the first, covering both the rigid first cross-sectional portion, and any loose particulate mixture by which it is surrounded. A second application of fluid follows in the manner described above, dissolving the adhesive and forming adhesive bonds between a portion of the previous cross-sectional portion, the filler, and, optionally, fiber of the second layer, and hardening to form a second rigid cross-sectional portion added to the first rigid cross-sectional portion of the final article. The movable surface is again indexed downward.

Figure 3:
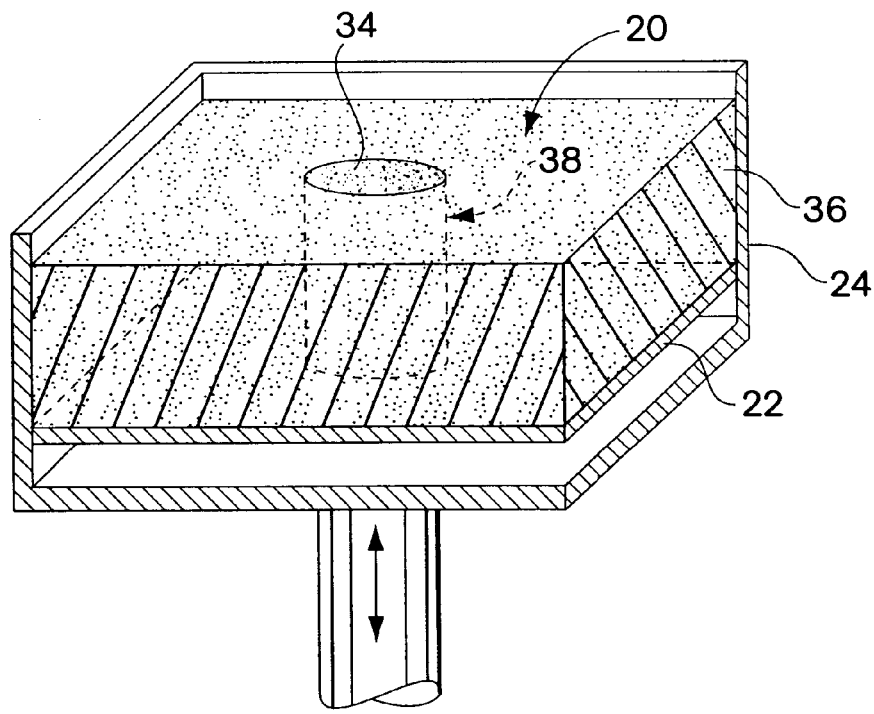
FIG. 3 illustrates schematically a view of a final article made from a series of steps illustrated in FIG. 2 enclosed in the container while it is still immersed in the loose unactivated particles.

The previous steps of applying a layer of particulate mixture, including the adhesive, applying the activating fluid, and indexing the movable surface downward are repeated until the final article is completed. FIG. 3 is a schematic representation of the final cylindrical article after it has been completely formed. At the end of the process, only the top surface 34 of a final article 38 is visible in the container. The final article is preferably completely immersed in a bed 36 of unactivated particulate material. Alternatively, those skilled in this art would know how to build an article in layers upward from an immovable platform, by successively depositing, smoothing and printing a series of such layers.

Figure 4:
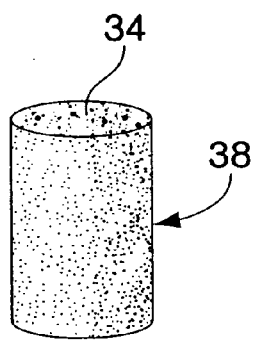
FIG. 4 illustrates schematically a view of the final article from FIG. 3.

FIG. 4 is a schematic representation of the final cylindrical article 38. The unactivated particulate material is preferably removed by blown air or a vacuum. After removal of the unactivated particulate material from the final article 38, post-processing treatment may be performed, including cleaning, infiltration with stabilizing materials, painting, etc.

The method of the present invention is capable of producing features on the order of about 250 $\mu$m. The accuracy achieved by the method of the present invention is in the range of about +/−250 $\mu$m. Shrinkage of the final article is about 1%, which can easily be factored into the build to increase accuracy.

Adhesive

The adhesive is a compound selected for the characteristics of high solubility in the activating fluid, low solution viscosity, low hygroscopicity, and high bonding strength. The adhesive should be highly soluble in the solvent in order ensure that it is incorporated rapidly and completely into the activating fluid. Low solution viscosity is preferred to ensure that once dissolved in the activating fluid, the solution migrates quickly to sites in the powder bed to adhesively bond together the reinforcing materials. The adhesive is preferably milled as finely as possible prior to admixture with the filler and/or prior to coating the filler particles in order to increase the available surface area, enhancing dissolution in the solvent, without being so fine as to cause "caking", an undesirable article characteristic. Typical adhesive particle grain sizes are about 10–20 $\mu$m. Low hygroscopicity of the adhesive avoids absorption of excessive moisture from the air, which causes "caking", in which unactivated powder spuriously adheres to the outside surface of the part, resulting in poor surface definition.

Water-soluble compounds are preferred for the adhesive of the present invention, although other compounds can be used. Compounds suitable for use as the adhesive of the present invention can be selected from the following non-limiting list: water-soluble polymers, carbohydrates, sugars, sugar alcohols, proteins, and some inorganic compounds. Water-soluble polymers with low molecular weights dissolve more quickly because smaller molecules diffuse more rapidly in solution. Suitable water-soluble polymers include polyethylene glycol, sodium polyacrylate, polyvinyl alcohol, polyvinyl pyrrolidone, sodium polyacrylate copolymer with maleic acid, and polyvinyl pyrrolidone copolymer with vinyl acetate; carbohydrates include acacia gum, locust bean gum, pregelatinized starch, acid-modified starch, hydrolyzed starch, sodium carboxymethylcellulose, sodium alginate and hydroxypropyl cellulose. Suitable sugars and sugar alcohols include sucrose, dextrose, fructose, lactose, polydextrose, sorbitol and xylitol. Organic compounds including organic acids and proteins can also be used, including citric acid, succinic acid, polyacrylic acid, gelatin, rabbit-skin glue, soy protein, and urea. Inorganic compounds include plaster, bentonite, sodium silicate and salt.

Filler

The filler of the present invention is a compound selected for the characteristics of insolubility in the activating fluid, or extremely low solubility in the activating fluid, rapid wetting, low hygroscopicity, and high bonding strength. The filler provides mechanical structure to the hardened composition. Sparingly soluble filler material is preferred, but insoluble filler material can be used. The filler particles become adhesively bonded together when the adhesive dries/hardens after the activating fluid has been applied. Preferably, the filler includes a distribution of particle grain sizes, ranging from the practical maximum of about 200 $\mu$m downward, to the practical minimum of about 20 $\mu$m. Large grain sizes appear to improve the final article quality by forming large pores in the powder through which the fluid can migrate rapidly, permitting production of a more homogeneous material. Smaller grain sizes serve to reinforce article strength.

Compounds suitable for use as the filler of the present invention can be selected from the same general groups from which the adhesive is selected, provided that the solubility, hygroscopicity, bonding strength and solution viscosity criteria described above are met. Preferred fillers include starches such as maltodextrin. One of ordinary skill in the art will know that the selection of the solvent determines which filler can be used.

Reinforcing Fiber

The reinforcing fiber of the present invention is preferably either insoluble or substantially slower dissolving than the adhesive in the fluid which activates the adhesive. The reinforcing fiber is a stiff material chosen to increase the mechanical reinforcement and dimensional control of the final article without making the powder too difficult to spread. In order to promote wetting of the reinforcing fibers, the fiber chosen have a high affinity for the solvent. The preferred embodiment includes a fiber length approximately equal to the layer thickness, which provides the greatest degree of mechanical reinforcement. Using longer fibers adversely affects the surface finish, and using too much fiber of any length will make spreading the powder increasingly difficult. Fibrous material suitable for reinforcing the present invention includes, but is not limited to polymeric fiber, ceramic fiber, graphite fiber and fiberglass. The polymeric fiber may be cellulose and cellulose derivatives or substituted or unsubstituted, straight or branched, alkyl or alkene, monomers containing up to eight carbon atoms. Specific useable fibrous materials include, but are not limited to cellulose fiber, silicon carbide fiber, graphite fiber, aluminosilicate fiber, polypropylene fiber, and fiberglass.

As indicated in Table 1, both the reinforcing fiber and the stabilizing fiber are preferred to be cellulose. Some of the useful properties of cellulose making it particularly suitable for use in connection with the invention are low toxicity, biodegradability, low cost and availability in a wide variety of lengths.

Further considerations when selecting the adhesive, filler and fiber depend on the desired properties of the final article. The final strength of the finished article depends largely on the quality of the adhesive contacts between the particles of the mixture, and the size of the empty pores that persist in the material after the adhesive has hardened; both of these factors vary with the grain size of the particulate material. In general, the mean size of the grains of particulate material is preferably not larger than the layer thickness. A distribution of grain sizes increases the packing density of the particulate material, which in turn increases both article strength and dimensional control.

Printing Aid

As indicated in Table 1, lecithin is used as a printing aid in the exemplary particulate mixture. Lecithin is a liquid which is only slightly soluble in water. By adding a small amount to the powder, the lecithin provides a light adhesion between powder grains before printing, thereby reducing dust formation. After printing, the lecithin continues to adhere insoluble grains together for a short time until it dissolves. This effect tends to reduce distortion in printed layers in the brief time that is required for the adhesive to dissolve and redistribute in the powder. Hydrophillic grades of lecithin are preferred. A wide variety of other liquid compounds work for the same purpose. Polypropylene glycol (PPG) with a molecular weight of about 2000 and citronellol are two examples.

Activating Fluid

The fluid of the present invention is selected to comport with the degree of solubility required for the various particulate components of the mixture, as described above. The fluid includes a solvent in which the adhesive is active, preferably soluble, and can include processing aids such as a humectant, a flowrate enhancer, and preferably a dye. An ideal solvent is one in which the adhesive is highly soluble, and in which both the filler and fiber are substantially less soluble. The solvent can be aqueous or non-aqueous, although aqueous are preferred. Suitable solvents can be selected from the following non-limiting list: water, methyl alcohol, ethyl alcohol, isopropyl alcohol, acetone, methylene chloride, acetic acid, and ethyl acetoacetate.

Humectant

A humectant can be included in the inventive mixture to retard evaporation of the solvent from the printed material, and to prevent drying/clogging of the printhead delivery system. Water is a plasticizer for the preferred adhesive. Thus, by keeping water in the adhesive, the humectant increases the article toughness. Glycerol is the preferred humectant when the solvent is aqueous. Other polyhydric alcohols, including but not limited to ethylene glycol and propylene glycol, are also known in the art to retard evaporation.

Flowrate Enhancer

A flowrate enhancer can be included that has some humectant properties, but serves mainly to alter the hydrodynamic properties or wetting characteristics of the fluid to maximize the volume of fluid delivered by the printhead. Flowrate enhancement is thought to be a viscoelastic phenomena increasing the flow rate of the fluid, allowing thicker layers to be printed, thus allowing the final article to be built more quickly. Preferred compounds that increase the flowrate of the fluid, either by reducing friction between the fluid and the walls of the jet, or by reducing the viscosity of the fluid, include ethylene glycol diacetate and potassium aluminum sulfate. Other suitable compounds for use as the flowrate enhancer can be selected from the following non-limiting list: isopropyl alcohol, ethylene glycol monobutyl ether, diethylene glycol monobutyl ether, dodecyl dimethylammoniopropane sulfonate, glycerol triacetate, ethyl acetoacetate, and water-soluble polymers including polyvinyl pyrrolidone with a molecular weight of about 30,000 units, polyethylene glycol, polyacrylic acid, and sodium polyacrylate. For the ionic polymers, such as sodium polyacrylate, the increase in flow rate varies with pH.

Dye

The fluid of the present invention preferably includes a dye to provide a visual aid to the operator while building the article. The dye provides contrast between activated and unactivated powder which allows the operator to monitor the printed layers while building the article. The dye can be selected from the group including, but not limited to, naphthol blue-black and direct red. Numerous other dyes compatible with the fluid will be known to those skilled in the art.

The materials and method of the present invention present several advantages over prior Three Dimensional Printing methods. The materials used in the present invention are non-toxic and inexpensive. Because the adhesive is added directly to the particulate mixture, it eliminates spraying adhesive, particularly adhesive including high levels of suspended solids, through the printhead. Instead, the method of the present invention involves spraying preferably an aqueous solvent, which overcomes problems such as clogging associated with prior art methods that involve spraying a binder to a layer of powder.

The equipment used in the method of the present invention is reliable, inexpensive, and easy to maintain, making it ideal for use in an office environment. The materials used in the present invention are much more compatible with ink-jet technology than the liquid binder method. Thus, less equipment maintenance is required, and the reliability of the equipment is increased. Therefore, the method of the present invention involves shorter build times and less labor than prior art methods.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

What is claimed is:

1. A method for forming an article comprising:
   applying, to a first portion of a first film of particles that each carry an activatable adhesive, a fluid that activates said adhesive, in an amount sufficient to activate said adhesive to the extent that the particles within the first portion adhere together to form an essentially solid, singular article;
   forming a second film of the particles on the first film; and
   applying, to a first portion of said second film of said particles, said fluid in an amount sufficient to activate said adhesive to the extent that the particles within said first portion of said second film adhere to each other and to at least a portion of said first portion of said first layer to form an essentially solid, singular article from said first portion of said first film and said first portion of said second film article;
   wherein, at least a portion of said particles are sparingly soluble in said fluid.

2. The method of claim 1, involving allowing a second portion of the first film contiguous with the first portion of the first film and a second portion of the second film contiguous with the first portion of the second film to remain free of said fluid to the extent that said second portions remain non-adherent, further comprising removing particles defining the second portions of the first and second films.

3. The method of claim 2 further comprising:

applying, to a first portion of successive films of particles that each carry an activatable adhesive, a fluid that activates said adhesive, in an amount sufficient to activate said adhesive to the extent that the particles within the first portion of successive films adhere together and to at least a portion of an underlying film to form an essentially solid, singular article; and allowing a second portion of each of said successive films contiguous with the first portion of each of said successive films to remain free of said fluid to the extent that said second portions remain non-adherent, further comprising removing particles defining the second portions of said successive films.

4. The method of claim 1, wherein said sparingly soluble particles include an essentially solid filler.

5. The method of claim 4, wherein said sparingly soluble particles include a first fibrous component.

6. The method of claim 5, wherein said first fibrous component has a length of about 60 $\mu$m to about 200 $\mu$m.

7. The method of claim 6, wherein said sparingly soluble particles include a second fibrous component.

8. The method of claim 7, wherein said second fibrous component has a length of about 30 $\mu$m to about 100 $\mu$m.

9. The method of claim 6, wherein said fluid is an aqueous fluid.

10. The method of claim 8, wherein said fluid is an aqueous fluid.

11. The method of claim 1, wherein said particles have a mean diameter of about 10–300 $\mu$m.

12. A method for forming an article comprising:

applying, to a first portion of a first film of particles that each carry an activatable adhesive, an aqueous fluid that activates said adhesive, in an amount sufficient to activate said adhesive to the extent that the particles within the first portion adhere together to form an essentially solid, singular article;

forming a second film of the particles on the first film; and applying, to a first portion of said second film of said particles, said aqueous fluid in an amount sufficient to activate said adhesive to the extent that the particles within said first portion of said second film adhere to each other and to at least a portion of said first portion of said first layer to form an essentially solid, singular article from said first portion of said first film and said first portion of said second film article.

13. The method of claim 12, involving allowing a second portion of the first film contiguous with the first portion of the first film and a second portion of the second film contiguous with the first portion of the second film to remain free of said aqueous fluid to the extent that said second portions remain non-adherent, further comprising removing particles defining the second portions of the first and second films.

14. The method of claim 13, wherein a portion of said particles is sparingly soluble in said aqueous fluid.

15. The method of claim 14, wherein said portion of sparingly soluble particles include a first fibrous component.

16. The method of claim 15, wherein said first fibrous component has a length of about 60 $\mu$m to about 200 $\mu$m.

17. The method of claim 16, wherein said sparingly soluble particles include a second fibrous component.

18. The method of claim 17, wherein said second fibrous component has a length of about 30 $\mu$m to about 100 $\mu$m.

19. The method of claim 12, wherein said particles have a mean diameter of about 10–300 $\mu$m.

20. A method comprising:

providing a plurality of adjacent particles of mean diameter of about 10–300 $\mu$m, comprised of an essentially solid filler and an adhesive;

applying to said plurality of particles a fluid, within which said adhesive is essentially soluble and said filler is sparingly soluble, that activates said adhesive from an essentially inert state, in an amount sufficient to bond said plurality of particles together to define an essentially solid, singular article.

21. The method of claim 20, wherein said plurality of adjacent particles include a first fibrous component that is sparingly soluble in said fluid.

22. The method of claim 21, wherein said first fibrous component has a length of about 60 $\mu$m to about 200 $\mu$m.

23. The method of claim 22, wherein said plurality of adjacent particles further include a second fibrous component that is sparingly soluble in said fluid.

24. The method of claim 23, wherein said second fibrous component has a length of about 30 $\mu$m to about 100 $\mu$m.

25. The method of claim 22, wherein said fluid is an aqueous fluid.

26. The method of claim 24, wherein said fluid is an aqueous fluid.

* * * * *